(12) United States Patent
Higashiyama et al.

(10) Patent No.: US 11,879,652 B2
(45) Date of Patent: Jan. 23, 2024

(54) DEVICE-REGISTRATION-WORK ASSISTING SYSTEM

(71) Applicant: DAIKIN INDUSTRIES, LTD., Osaka (JP)

(72) Inventors: Shin Higashiyama, Osaka (JP); Hiroshi Dohmae, Osaka (JP); Daisuke Satou, Osaka (JP); Sou Yanagimoto, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 45 days.

(21) Appl. No.: 17/426,570

(22) PCT Filed: Feb. 6, 2020

(86) PCT No.: PCT/JP2020/004540
§ 371 (c)(1),
(2) Date: Jul. 28, 2021

(87) PCT Pub. No.: WO2020/166481
PCT Pub. Date: Aug. 20, 2020

(65) Prior Publication Data
US 2022/0107110 A1    Apr. 7, 2022

(30) Foreign Application Priority Data

Feb. 13, 2019   (JP) ................................ 2019-023528

(51) Int. Cl.
*F24F 11/00* (2018.01)
*F24F 11/49* (2018.01)
(Continued)

(52) U.S. Cl.
CPC .............. *F24F 11/49* (2018.01); *F24F 11/72* (2018.01); *F24F 11/80* (2018.01)

(58) Field of Classification Search
CPC ............. F24F 11/49; F24F 11/72; F24F 11/80
See application file for complete search history.

(56) References Cited

U.S. PATENT DOCUMENTS

| | | | |
|---|---|---|---|
| 2014/0019994 A1 | 1/2014 | Miyazawa | |
| 2014/0058567 A1* | 2/2014 | Matsuoka | ............. G05B 15/02 700/276 |
| 2016/0381767 A1 | 12/2016 | Tiberi et al. | |

FOREIGN PATENT DOCUMENTS

| | | |
|---|---|---|
| JP | 2009-164800 A | 7/2009 |
| JP | 2010-9558 A | 1/2010 |

(Continued)

OTHER PUBLICATIONS

European Search Report of corresponding EP Application No. 20 75 4876.9 dated Feb. 21, 2022.
(Continued)

*Primary Examiner* — Mark A Connolly
(74) *Attorney, Agent, or Firm* — Global IP Counselors, LLP (57) ABSTRACT

A device-registration-work assisting system includes a plurality of notification units, and a mobile terminal carriable by a worker. Each notification unit is built in or disposed near one of a plurality of devices subjected to registration work. The mobile terminal includes a display unit configured to display information regarding each of the devices, and a selection unit configured to select a corresponding one of the devices. The notification unit is configured to notify the worker by light, sound, or motion in response to the corresponding device being selected with the selection unit.

6 Claims, 10 Drawing Sheets

(51) Int. Cl.
*F24F 11/80* (2018.01)
*F24F 11/72* (2018.01)

(56) References Cited

FOREIGN PATENT DOCUMENTS

| JP | 2014-17735 | A | | 1/2014 | | |
|---|---|---|---|---|---|---|
| JP | 6167971 | B2 | | 7/2017 | | |
| WO | 2015/033594 | A1 | | 3/2015 | | |
| WO | WO-2017223008 | A1 | * | 12/2017 | ........... | G01C 21/206 |

OTHER PUBLICATIONS

International Search Report of corresponding PCT Application No. PCT/JP2020/004540 dated Mar. 17, 2020.
International Preliminary Report of corresponding PCT Application No. PCT/JP2020/004540 dated Aug. 26, 2021.

\* cited by examiner

ELECTROMAGNETIC WAVE INTENSITY MEASUREMENT

THE FOLLOWING DEVICES ARE FOUND.

| IDENTIFICATION INFORMATION | ELECTROMAGNETIC WAVE INTENSITY |
|---|---|
| 12b | STRONG |
| 12a | INTERMEDIATE |
| 12c | WEAK |
| ⋮ | ⋮ |

FIG. 5

REGISTRATION SCREEN

THE FOLLOWING DEVICES ARE FOUND.

LAYOUT DIAGRAM

DEVICE LIST

| IDENTIFICATION INFORMATION | LOCATION INFORMATION | REGISTER |
|---|---|---|
| 12a | E140° 43'56.9 N41° 45'58.0 | ☑ |
| 12b | ... | ☑ |
| 12c | ... | ☑ |
| ... | ... | ☑ |
| ⋮ | ⋮ | ⋮ |

REGISTER

DEVICE-REGISTRATION-WORK ASSISTING SYSTEM

CROSS-REFERENCE TO RELATED APPLICATIONS

This U.S. National stage application claims priority under 35 U.S.C. § 119(a) to Japanese Patent Application No. 2019-023528, filed in Japan on Feb. 13, 2019, the entire contents of which are hereby incorporated herein by reference.

BACKGROUND

Field of the Invention

The present disclosure relates to a device-registration-work assisting system.

Background Information

As described in Japanese Patent No. 6167971, when a plurality of devices are installed in a management-target building of a remote management system, each of the installed devices is registered to a remote management apparatus.

Summary

In the case where a plurality of devices are installed in a management-target building, the plurality of devices need to be registered to a remote management apparatus in a distinguished manner in order to effectively control the plurality of devices.

A device-registration-work assisting system according to a first aspect includes a notification unit and a mobile terminal. The notification unit is built in or disposed near each of a plurality of devices subjected to registration work. The mobile terminal is carried by a worker. The mobile terminal includes a display unit and a selection unit. The display unit displays information regarding each of the devices. The selection unit selects the device. The notification unit notifies the worker by light, sound, or motion in response to the corresponding device being selected with the selection unit.

This allows the worker to efficiently perform work for registering a plurality of devices to a remote management apparatus in a distinguished manner.

A device-registration-work assisting system according to a second aspect is the system according to the first aspect, in which the notification unit emits at least one of light or sound.

A device-registration-work assisting system according to a third aspect is the system according to the first aspect, in which the devices are air-conditioning indoor units. The notification unit is a first movable component configured to move to blow out air from the air-conditioning indoor unit or a second movable component configured to move to change a direction of the air blown out from the air-conditioning indoor unit.

A device-registration-work assisting system according to a fourth aspect is the system according to any of the first aspect to the third aspect, further including an electromagnetic wave emitter built in or disposed near each of the plurality of devices and configured to emit an electromagnetic wave. The mobile terminal further includes an intensity measurement unit and a display control unit. The intensity measurement unit measures an intensity of the electromagnetic wave emitted by each of the electromagnetic wave emitters. The display control unit controls, on the basis of the intensity of the electromagnetic wave measured by the intensity measurement unit, display of the display unit such that the worker is able to identify the device installed at a location near the worker.

DETAILED DESCRIPTION OF EMBODIMENT(S)

A device-registration-work assisting system 100 and a remote management apparatus 200 according to an embodiment of the present disclosure will be described below. Note that the embodiment below presents a specific example and does not limit the technical scope, and thus may be appropriately modified within a scope not departing from the gist.

(1) Overall Configuration

Figure 1:
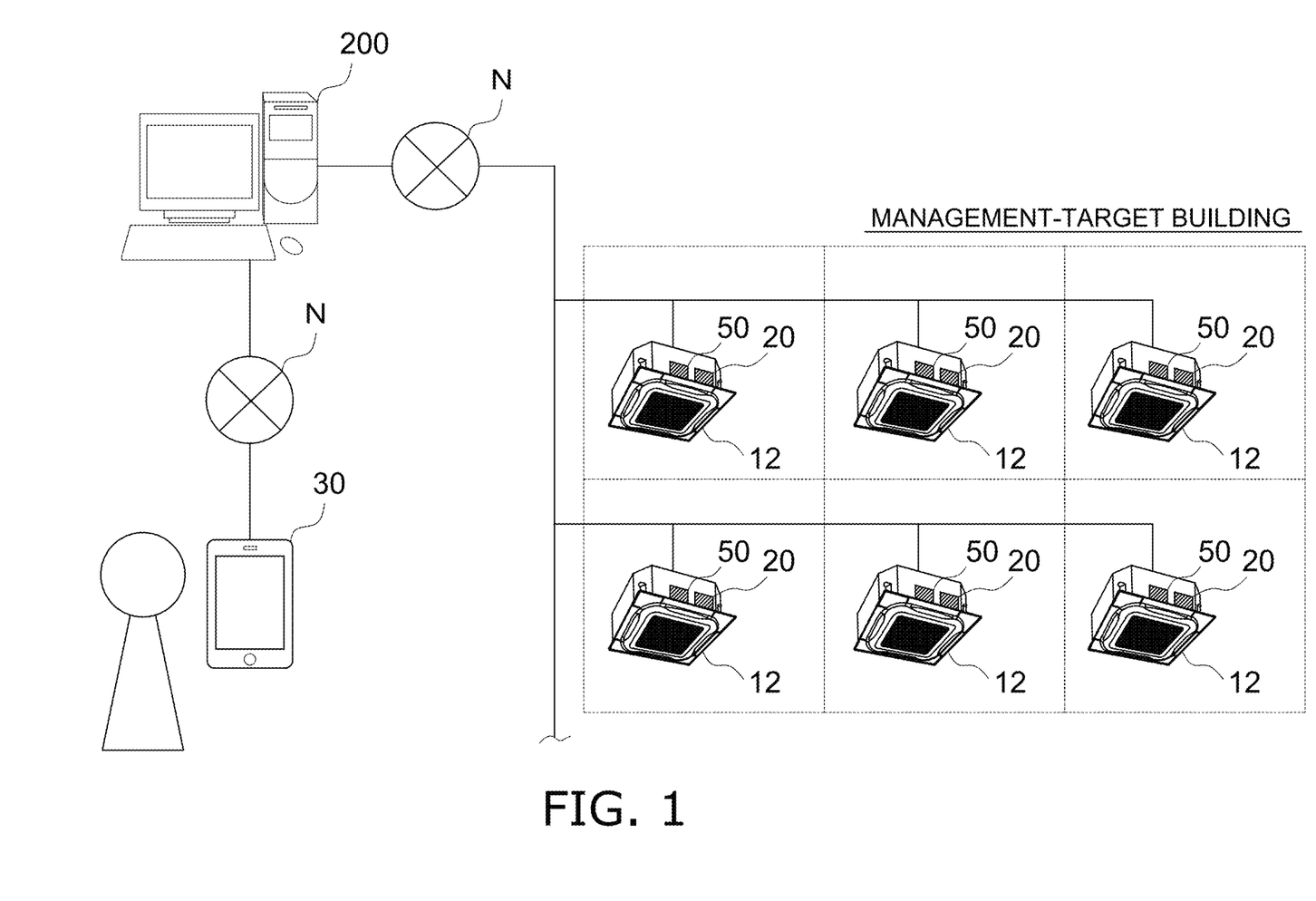
FIG. 1 is a diagram illustrating an overall configuration of a device-registration-work assisting system and a management apparatus.
Figure 2:
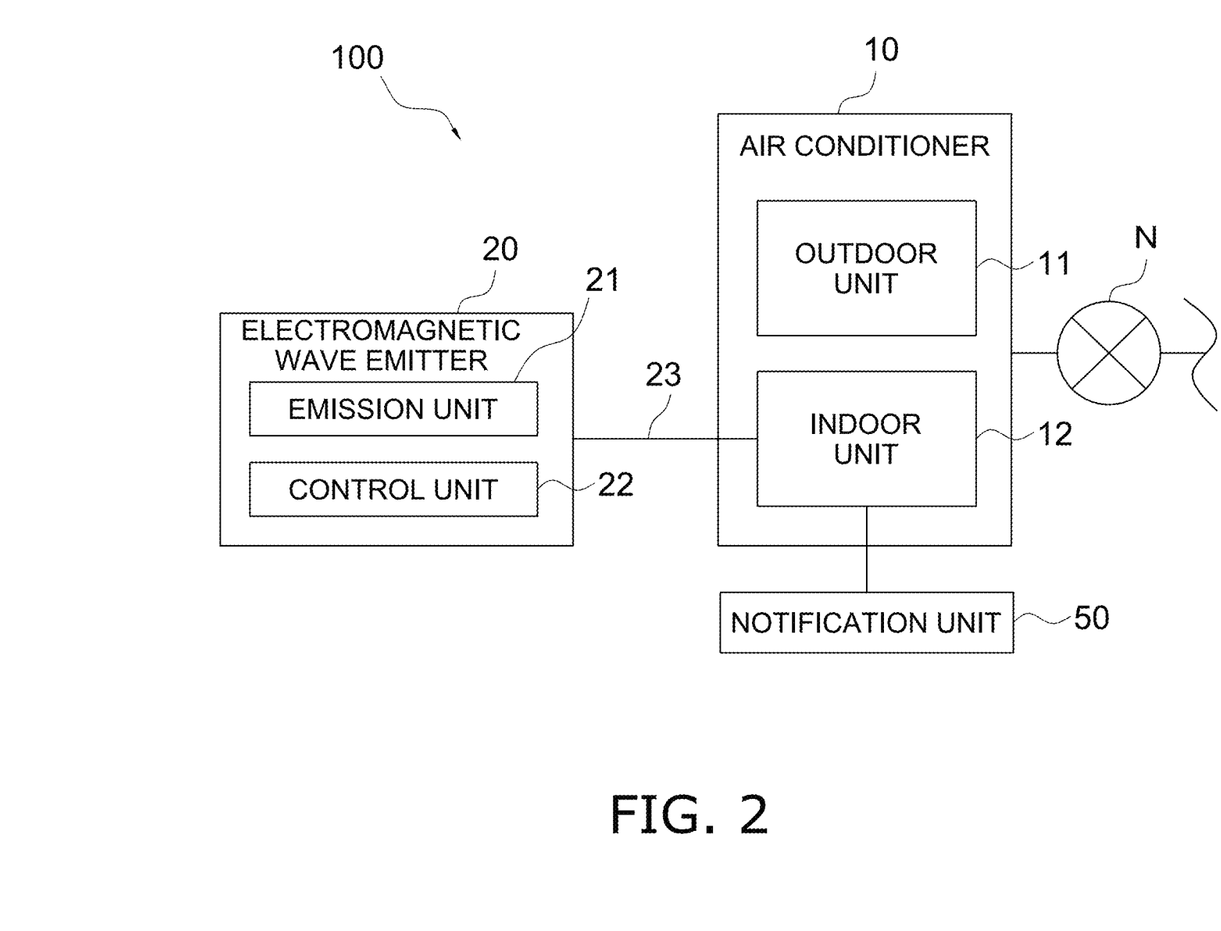
FIG. 2 is a schematic configuration diagram of an air conditioner and an electromagnetic wave emitter.
Figure 3:
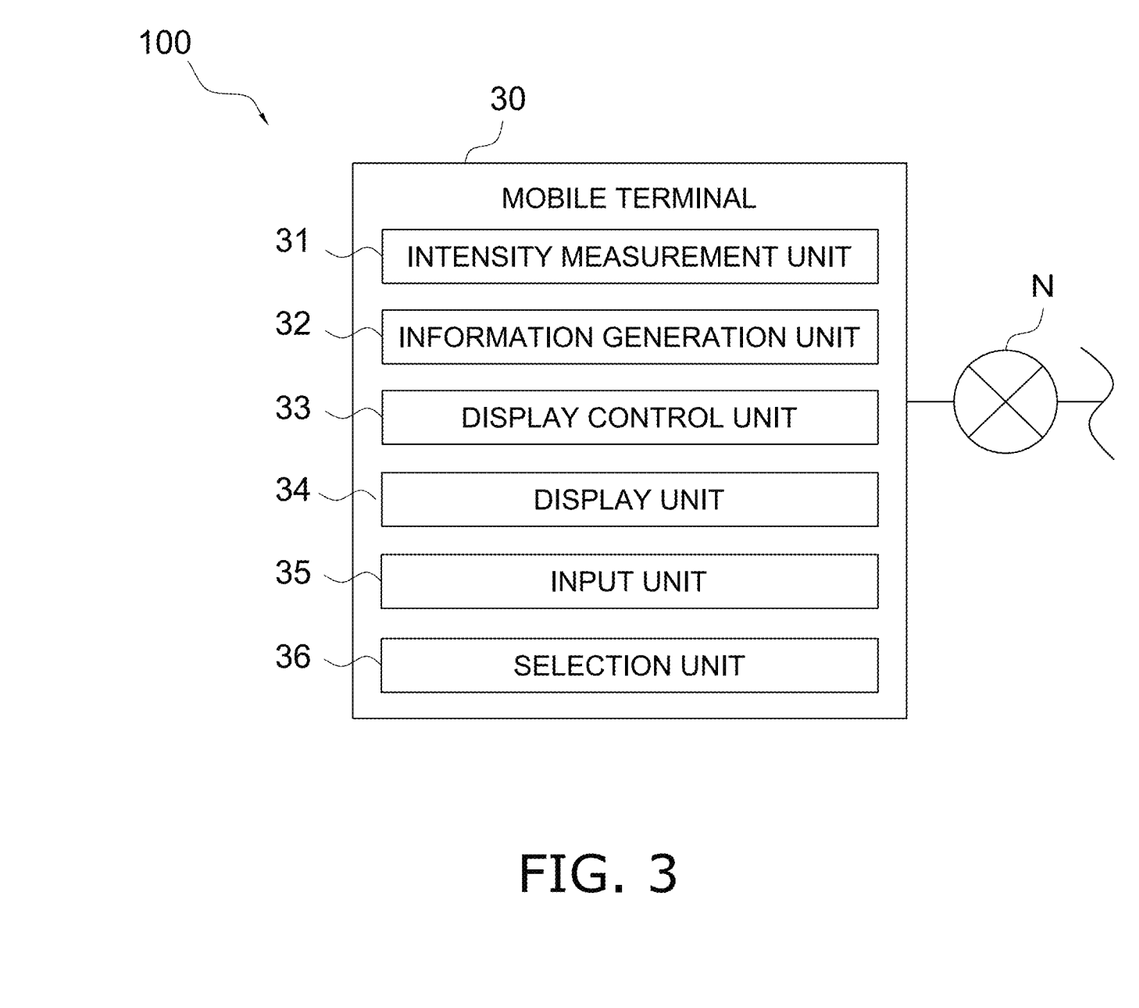
FIG. 3 is a schematic configuration diagram of a mobile terminal.

The remote management apparatus 200 illustrated in FIG. 1 is an apparatus disposed at a remote location apart from a management-target building in order to effectively control a plurality of devices installed in the management-target building. In order for the remote management apparatus 200 to control the plurality of devices, registration work for registering each of the devices to the remote management apparatus 200 in a distinguished manner is required. A worker visits the management-target building and performs this registration work. The device-registration-work assisting system 100 illustrated in FIG. 2 and FIG. 3 is a system for assisting the worker with the registration work. The device-registration-work assisting system 100 allows the worker who performs the registration work to identify an indoor unit 12 installed at a location near the worker from among the plurality of indoor units 12 installed in the management-target building.

(2) Device-Registration-Work Assisting System 100

In the present embodiment, the devices are the indoor units 12 of an air conditioner 10. Since the plurality of indoor units 12 all have the same configuration, FIG. 2 illustrates only one of them. The device-registration-work assisting system 100 mainly includes the air conditioner 10, electromagnetic wave emitters 20, and a mobile terminal 30.

(2-1) Air Conditioner 10

The air conditioner 10 is an apparatus capable of cooling and heating air in rooms or the like of the management-target building by performing a vapor compression refrigeration cycle. The air conditioner 10 is communicably connected to the remote management apparatus 200 via Internet N.

The air conditioner 10 mainly includes an outdoor unit 11 serving as a heat source unit, the plurality of indoor units 12 serving as use units, and refrigerant connection pipes (not illustrated) that connect the outdoor unit 11 and the plurality of indoor units 12 to each other. The plurality of indoor units 12 are connected to the outdoor unit 11 in parallel with each other through the refrigerant connection pipes, so that a vapor compression refrigerant circuit of the air conditioner 10 is constituted. The refrigerant connection pipes are refrigerant pipes installed at the site when the air conditioner 10 is installed in the management-target building.

The outdoor unit 11 is installed outdoors such as at a rooftop of the management-target building or at a place near a wall surface of the management-target building and constitutes part of the refrigerant circuit.

In the present embodiment, the indoor units 12 are indoor units installed by being embedded in openings provided at the ceiling of rooms or the like of the management-target building. The plurality of indoor units 12 are disposed at the ceiling at predetermined intervals. Each of the indoor units 12 is connected to a power source, which is not illustrated, in a space above the ceiling and is thus supplied with power. Each of the plurality of indoor units 12 has identification information. The identification information is unique information, such as a device ID or a MAC address, given to each of the indoor units 12.

(2-2) Electromagnetic Wave Emitter 20

The plurality of electromagnetic wave emitters 20 are provided to correspond to the respective indoor units 12 of the air conditioner 10. In the present embodiment, each of the electromagnetic wave emitters 20 is built in the corresponding indoor unit 12. The electromagnetic wave emitters 20 and the indoor units 12 are electrically connected to each other in a one-to-one manner. Thus, the plurality of electromagnetic wave emitters 20 are also disposed at the ceiling at predetermined intervals like the indoor units 12.

The electromagnetic wave emitters 20 and the indoor units 12 are connected to each other through electric wires 23. Each of the electromagnetic wave emitters 20 is supplied with power from the air conditioner 10 through the electric wire 23. Since the plurality of electromagnetic wave emitters 20 all have the same configuration, description will be given below by using one of the plurality of electromagnetic wave emitters 20.

The electromagnetic wave emitter 20 includes an emission unit 21 and a control unit 22.

The emission unit 21 emits, using an electromagnetic wave 40, a signal containing identification information of the indoor unit 12 corresponding to each of the electromagnetic wave emitters 20. Hereinafter, the electromagnetic wave 40 having the signal containing identification information is simply referred to as the electromagnetic wave 40.

Figure 4:
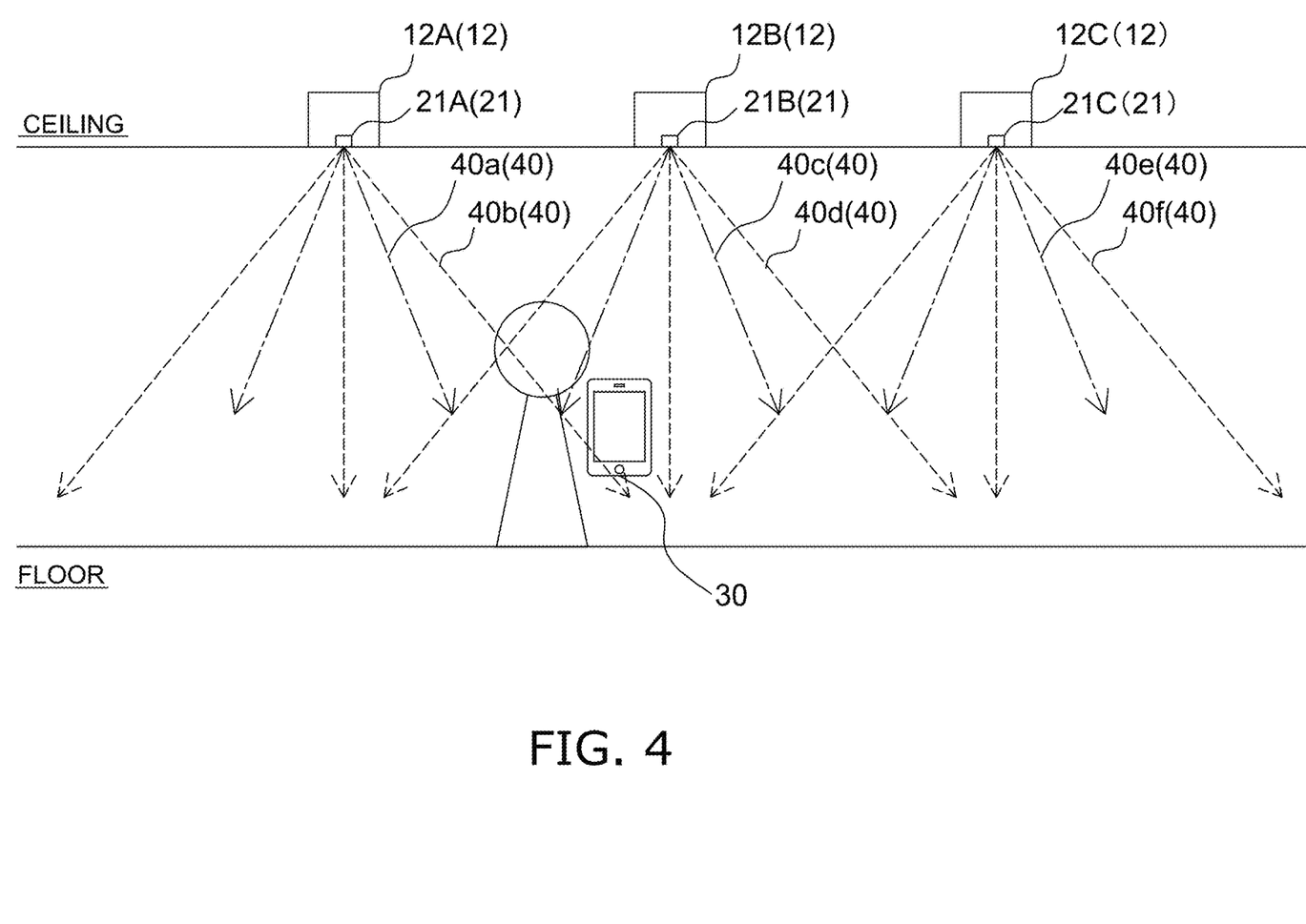
FIG. 4 illustrates an example of a screen presenting intensities of electromagnetic waves.

The electromagnetic wave 40 emitted by the emission unit 21 has a directivity such that the intensity of the electromagnetic wave 40 increases in a predetermined region. This predetermined region is a region where the mobile terminal 30 that performs measurement on the electromagnetic wave 40 is present. For example, as illustrated in FIG. 4, the intensity of the electromagnetic wave 40 increases in a direction of a floor where the worker carrying the mobile terminal 30 is present.

The emission unit 21 is capable of emitting the plurality of electromagnetic waves 40 having different intensities. For example, in FIG. 4, a first emission unit 21A that is the emission unit 21 corresponding to a first indoor unit 12A among the plurality of indoor units 12 emits a first electromagnetic wave 40a and a second electromagnetic wave 40b which are the electromagnetic waves 40 having different intensities. Likewise, a second emission unit 21B corresponding to a second indoor unit 12B emits a first electromagnetic wave 40c and a second electromagnetic wave 40d. A third emission unit 21C corresponding to a third indoor unit 12C emits a first electromagnetic wave 40e and a second electromagnetic wave 40f. The first electromagnetic waves 40a, 40c, and 40e respectively emitted by the first emission unit 21A, the second emission unit 21B, and the third emission unit 21C are the electromagnetic waves 40 having the same intensity. The second electromagnetic waves 40b, 40d, and 40f respectively emitted by the first emission unit 21A, the second emission unit 21B, and the third emission unit 21C are the electromagnetic waves 40 having the same intensity.

The control unit 22 controls the electromagnetic waves 40 emitted by the emission unit 21. For example, the control unit 22 controls the emission unit 21 to emit the electromagnetic waves 40 having different intensities at predetermined time intervals in series. The predetermined time intervals can be periodic time intervals or aperiodic time intervals. Alternatively, for example, the control unit 22 controls the emission unit 21 to simultaneously emit the electromagnetic waves 40 having different intensities.

(2-3) Mobile Terminal 30

The mobile terminal 30 illustrated in FIG. 3 is carried by the worker to the management-target building. The mobile terminal 30 is communicably connected to the remote management apparatus 200 via the Internet N.

The mobile terminal 30 includes an intensity measurement unit 31, an information generation unit 32, a display control unit 33, a display unit 34, an input unit 35, and a selection unit 36.

The intensity measurement unit 31 measures the intensity of the electromagnetic wave 40 emitted by the emission unit 21 of the electromagnetic wave emitter 20. The intensity measurement unit 31 is capable of simultaneously measuring the plurality of electromagnetic waves 40 emitted by the plurality of emission units 21. For example, in FIG. 4, the intensity measurement unit 31 is capable of simultaneously measuring the first electromagnetic waves 40a, 40c, and 40e and the second electromagnetic waves 40b, 40d, and 40f emitted by the first emission unit 21A, the second emission unit 21B, and the third emission unit 21C, respectively.

On the basis of the electromagnetic waves 40 measured by the intensity measurement unit 31, the information generation unit 32 generates information in which identification information of the indoor unit 12 corresponding to each of the electromagnetic wave emitters 20 and the intensity of the electromagnetic waves 40 are associated with each other. For example, in FIG. 4, the information generation unit 32 sums values of the intensities of the first electromagnetic wave 40a and the second electromagnetic wave 40b of the first emission unit 21A that are measured by the intensity measurement unit 31, values of the intensities of the first electromagnetic wave 40c and the second electromagnetic wave 40d of the second emission unit 21B that are measured by the intensity measurement unit 31, and values of the intensities of the first electromagnetic wave 40e and the second electromagnetic wave 40f of the third emission unit 21C that are measured by the intensity measurement unit 31. The information generation unit 32 determines that the indoor unit 12 is installed at a location nearer the worker sequentially from the largest sum value, and generates information indicating that the second indoor unit 12B, the first indoor unit 12A, and the third indoor unit 12C are present at the nearer distance from the worker in this order. Note that the information generated by the information generation unit 32 is not limited to this. The generation method and the form of the information can be appropriately modified as long as the information allows the worker to identify the indoor unit 12 installed at a location near the worker.

Figure 5:
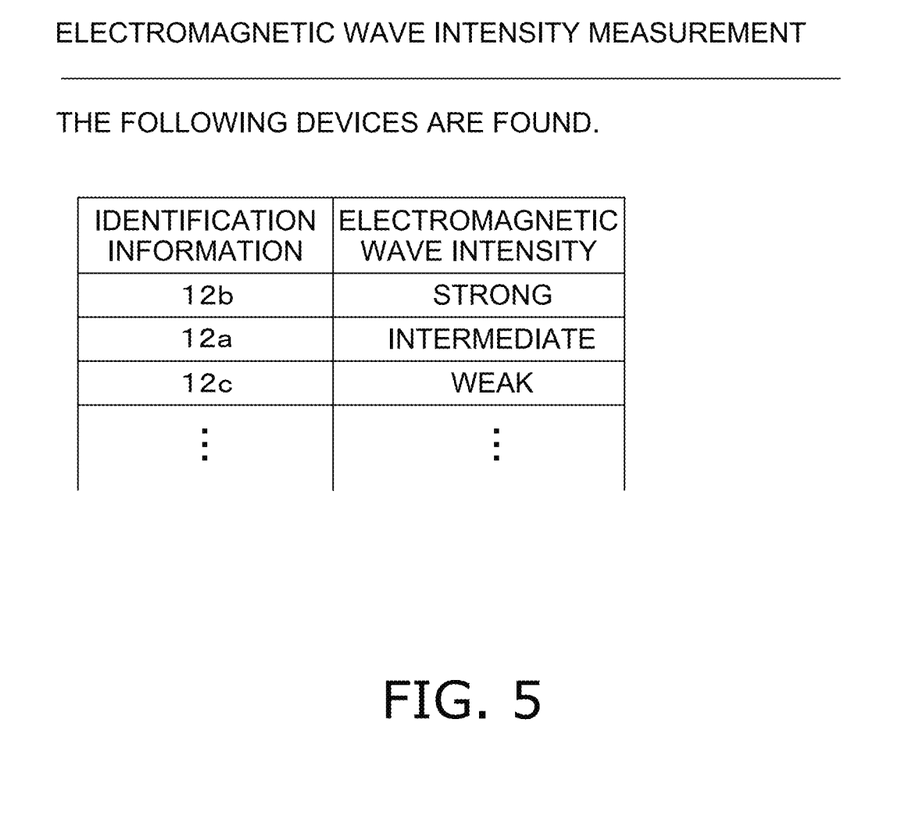
FIG. 5 is a schematic configuration diagram of the remote management apparatus.

The display control unit 33 controls display of the display unit 34 on the basis of the information generated by the information generation unit 32. Suppose that identification information of the first indoor unit 12A, identification information of the second indoor unit 12B, and identification information of the third indoor unit 12C in FIG. 4 are 12a, 12b, and 12c, respectively. Then, the display control unit 33 causes the display unit 34 to display a list as illustrated in FIG. 5, for example. In FIG. 5, on the basis of the information generated by the information generation unit 32, pieces of information in which the pieces of identification information of the plurality of indoor units 12 are associated with intensities of the electromagnetic waves 40 are displayed in an order from the indoor unit 12 present at the nearest location from the worker.

The display unit 34 displays the information, display of which is controlled by the display control unit 33.

The input unit 35 is for inputting information for the registration work. The worker performs an input via an input screen displayed on the display unit 34 of the mobile terminal 30. The input screen is, for example, a screen illustrated in FIG. 6. A method for inputting information for the registration work will be described later.

The selection unit 36 is for selecting the indoor unit 12 to be subjected to the registration work from among the plurality of indoor units 12. The worker selects the indoor unit 12 to be subjected to the registration work via a selection screen displayed on the display unit 34 of the mobile terminal 30. The indoor unit 12 receives, via the Internet N and the remote management apparatus 200, information indicating that the indoor unit 12 is selected by the selection unit 36.

(2-4) Notification Unit 50

The notification units 50 are for notifying the worker. The plurality of notification units 50 all have the same configuration. In the present embodiment, the notification units 50 are LEDs. The notification units 50 notify the worker by emitting light. In response to completion of the registration work for the indoor unit 12 selected with the selection unit 36, the notification unit 50 receives a notification start instruction from the remote management apparatus 200 via the indoor unit 12. The notification unit 50 that has received the instruction emits light to notify the worker.

The plurality of notification units 50 are provided to correspond to the respective indoor units 12 of the air conditioner 10. In the present embodiment, each of the notification units 50 is built in the corresponding indoor unit 12. However, the notification unit 50 may be disposed near the respective indoor units 12. The notification units 50 and the indoor units 12 are electrically connected to each other in a one-to-one manner. Thus, the plurality of notification units 50 are also disposed at the ceiling at predetermined intervals like the indoor units 12. Electric wires 51 that connect the notification units 50 and the indoor units 12 to each other include a communication line and a power source line. Each of the notification units 50 is supplied with power from the air conditioner 10 through the power source line of the electric wire 51 and is capable of communicating with the air conditioner 10 through the communication line of the electric wire 51.

(3) Remote Management Apparatus 200

Figure 7:
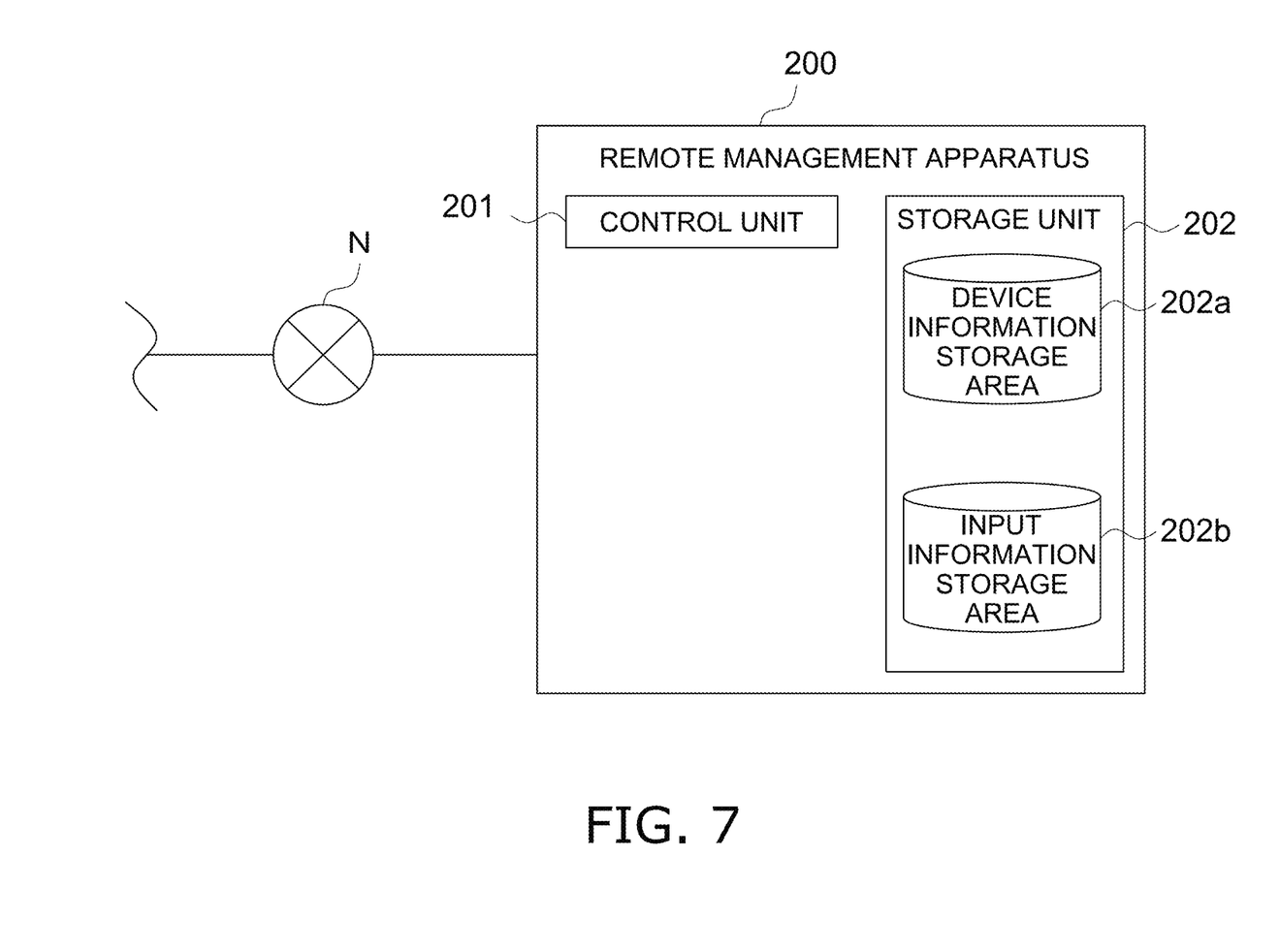
FIG. 7 is a schematic configuration diagram of the remote management apparatus.

The remote management apparatus 200 illustrated in FIG. 7 is an apparatus disposed at a remote location apart from the management-target building in order to effectively control the plurality of indoor units 12 installed in the management-target building. The remote management apparatus 200 includes a control unit 201 and a storage unit 202. The remote management apparatus 200 is communicably connected to the air conditioner 10 and the mobile terminal 30 via the Internet N.

The control unit 201 remotely controls the plurality of indoor units 12.

The storage unit 202 includes a device information storage area 202a and an input information storage area 202b. The device information storage area 202a stores information regarding the plurality of indoor units 12. The information regarding the indoor unit 12 is information including identification information of the indoor unit 12 and location information that is information regarding the location where the indoor unit 12 is disposed in the management-target building. The input information storage area 202b is for storing information that is input with the input unit 35 of the mobile terminal 30 and that is received via the Internet N.

(4) Registration Work

Figure 8:
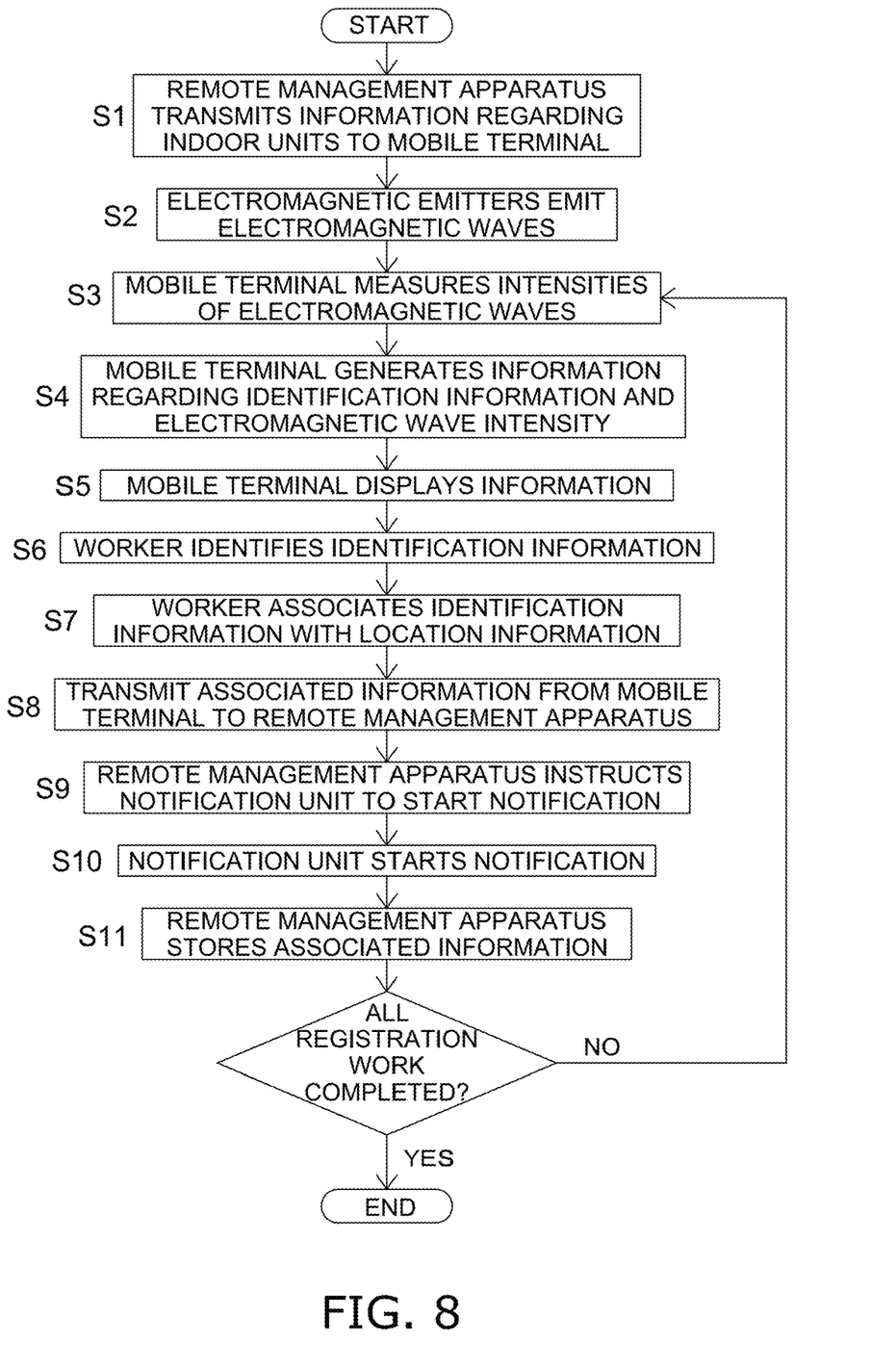
FIG. 8 is a flowchart of an operation of registration work.

In the registration work, the worker performs work for associating the identification information of each of the indoor units 12 stored in the remote management apparatus 200 with the location information. An example of an operation of the registration work relating to the remote management apparatus 200 and the device-registration-work assisting system 100 will be described below with reference to FIG. 8. Note that the example of the operation illustrated in FIG. 8 can be appropriately modified. As long as the processing is appropriately performed, the order of any of steps may be switched, any of steps may be simultaneously performed, or another step not illustrated may be added.

First, in step S1, the remote management apparatus 200 transmits the information regarding the plurality of indoor units 12 stored in the device information storage area 152a thereof to the mobile terminal 30 via the Internet N.

Subsequently, in steps S2 to S6, the worker identifies the identification information of the indoor unit 12 installed at the location near the worker.

In step S2, the electromagnetic wave emitters 20 emit the electromagnetic waves 40. The electromagnetic waves 40 emitted by the emission units 21 are controlled by the respective control units 22.

In step S3, the intensity measurement unit 31 of the mobile terminal 30 measures the intensities of the plurality of electromagnetic waves 40 emitted by the emission units 21. The intensity measurement unit 31 continues the measurement for a certain period in which the information generation unit 32 generates information.

In step S4, on the basis of the electromagnetic waves 40 measured by the intensity measurement unit 31, the information generation unit 32 generates information in which the identification information of the indoor unit 12 corresponding to each of the electromagnetic wave emitters 20 and the intensity of the electromagnetic waves 40 are associated with each other.

In step S5, the display control unit 33 causes the display unit 34 to display the information generated by the information generation unit 32. For example, the display unit 34 displays the information as illustrated in FIG. 5.

In step S6, the worker identifies the identification information of the indoor unit 12 installed at the location near the worker on the basis of the information displayed on the display unit 34.

Subsequently, in steps S7 to S11, the worker performs the registration work to the remote management apparatus 200.

Figure 6:
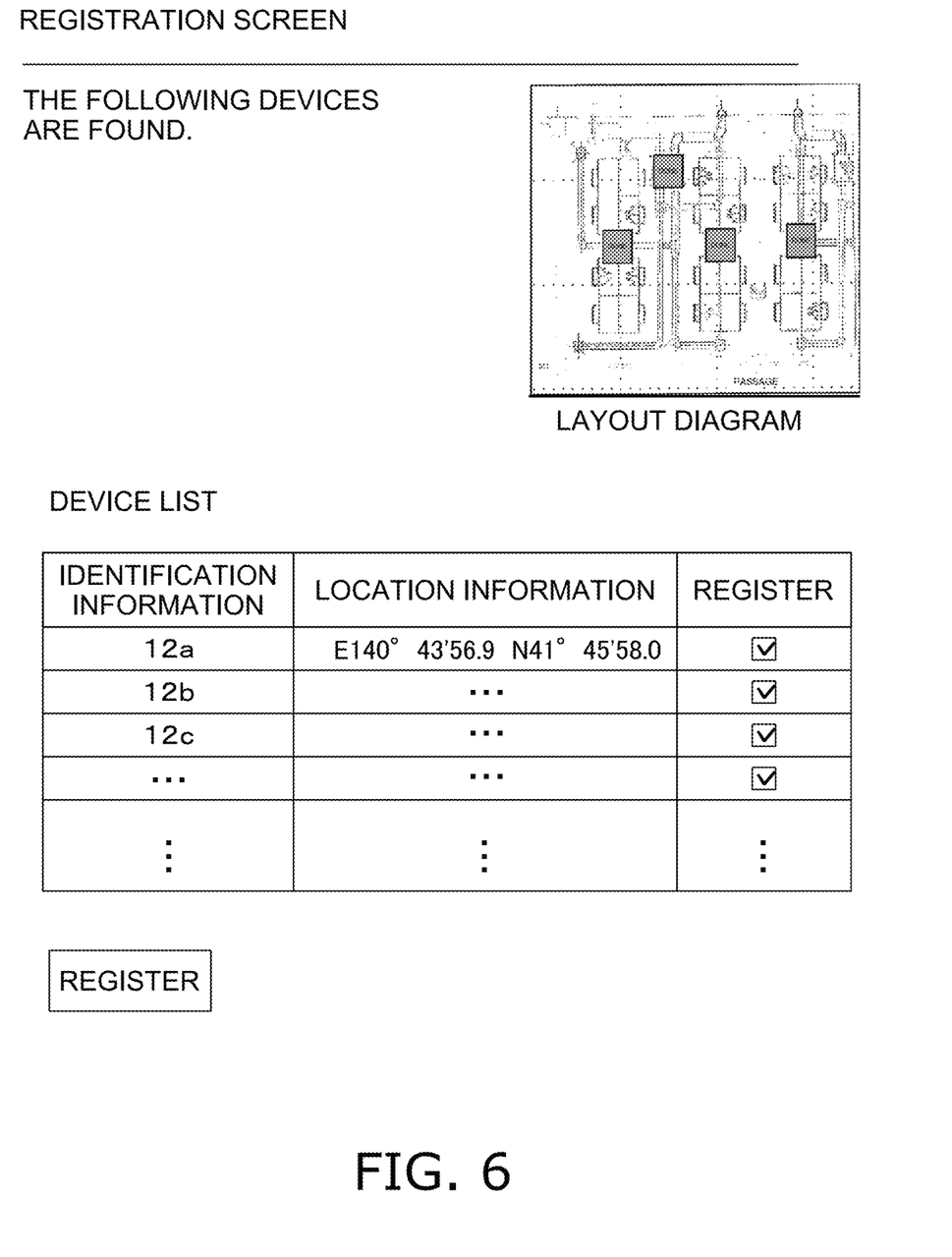
FIG. 6 illustrates an example of an input screen for registration work.

In step S7, the worker associates the identified identification information of the indoor unit 12 with the appropriate location information. Specifically, the input screen that includes the information regarding the indoor units 12 received from the remote management apparatus 200 and that is illustrated in FIG. 6 is displayed on the input unit 35 of the mobile terminal 30. The worker performs an input of selecting the identified identification information of the indoor unit 12 from the list displayed in the input screen and associating the identification information with the location information. Consequently, the identification information of the indoor unit 12 and the location information are associated with each other.

In step S8, the associated information is transmitted from the mobile terminal 30 to the remote management apparatus 200 via the Internet N.

In step S9, the remote management apparatus 200 transmits, via the Internet N, a notification start instruction to the indoor unit 12 whose identification information is associated with the location information. The indoor unit 12 that has received the instruction transmits the instruction to the notification unit 50 through the electric wire 51.

In step S10, the notification unit 50 that has received the notification start instruction starts notification. Herein, the notification unit 50 notifies the worker by emitting light.

In step S11, the indoor unit 12 installed at the location near the worker notifies the worker, so that the worker confirms whether the identification information and the location information are appropriately associated with each other.

In step S12, the information in which the identification information and the location information are appropriately associated with each other is stored in the input information storage area 152b of the storage unit 202 of the remote management apparatus 200, and is used by the control unit 22 of the remote management apparatus 200 to effectively control the plurality of indoor units 12.

(5) Features (5-1)

The device-registration-work assisting system 100 includes: the notification unit 50 built in or disposed near each of the plurality of indoor units 12 subjected to registration work; and the mobile terminal 30 that is carried by a worker and that includes the display unit 34 configured to display information regarding each of the indoor units 12 and the selection unit 36 configured to select the indoor unit 12. The notification unit 50 notifies the worker by light in response to the corresponding indoor unit 12 being selected with the selection unit 36.

This allows the worker to confirm whether the plurality of indoor units 12 are appropriately registered to the remote management apparatus 200 and to efficiently perform the registration work.

(5-2)

The device-registration-work assisting system 100 further includes the electromagnetic wave emitter 20 built in or disposed near each of the plurality of indoor units 12 and configured to emit the electromagnetic wave 40. The mobile terminal 30 further includes the intensity measurement unit 31 configured to measure intensity of the electromagnetic wave 40 emitted by each of the electromagnetic wave emitters 20; and the display control unit 33 configured to control, on the basis of the intensity of the electromagnetic wave 40 measured by the intensity measurement unit 31, display of the display unit 34 such that the worker is able to identify the indoor unit 12 installed at the location near the worker.

This allows the worker to identify the indoor unit 12 installed at a location near the worker in accordance with the information displayed on the display unit 34 of the mobile terminal 30 and to efficiently perform the registration work.

(6) Modifications

The embodiment described above can be appropriately modified as presented by modifications below. Note that each of the modifications may be used in combination with another modification within a range not causing any contradiction.

(6-1)

In the embodiment described above, the indoor units 12 are installed by being embedded in openings provided at the ceiling of rooms or the like of the management-target building. However, the indoor units 12 are not necessary limited to this, and may be appropriately modified. For example, the indoor units 12 may be ceiling-suspended units suspended from the ceiling or wall-mounted units mounted on the wall of the management-target building.

In addition, the electromagnetic wave emitters 20 need not be built in the indoor units 12, and may be independently disposed near the indoor units 12 or may be built in other devices disposed near the indoor units 12.

Further, the notification units 50 need not be built in the indoor units 12, and may be independently disposed near the indoor units 12 or may be built in other devices disposed near the indoor units 12.

(6-2)

In the embodiment described above, the notification units 50 are LEDs and notify the worker by emitting light. However, the form of the notification units 50 is not limited to this. For example, the notification units 50 may be buzzers or speakers and may notify the worker by emitting sound.

(6-3)

Figure 9:
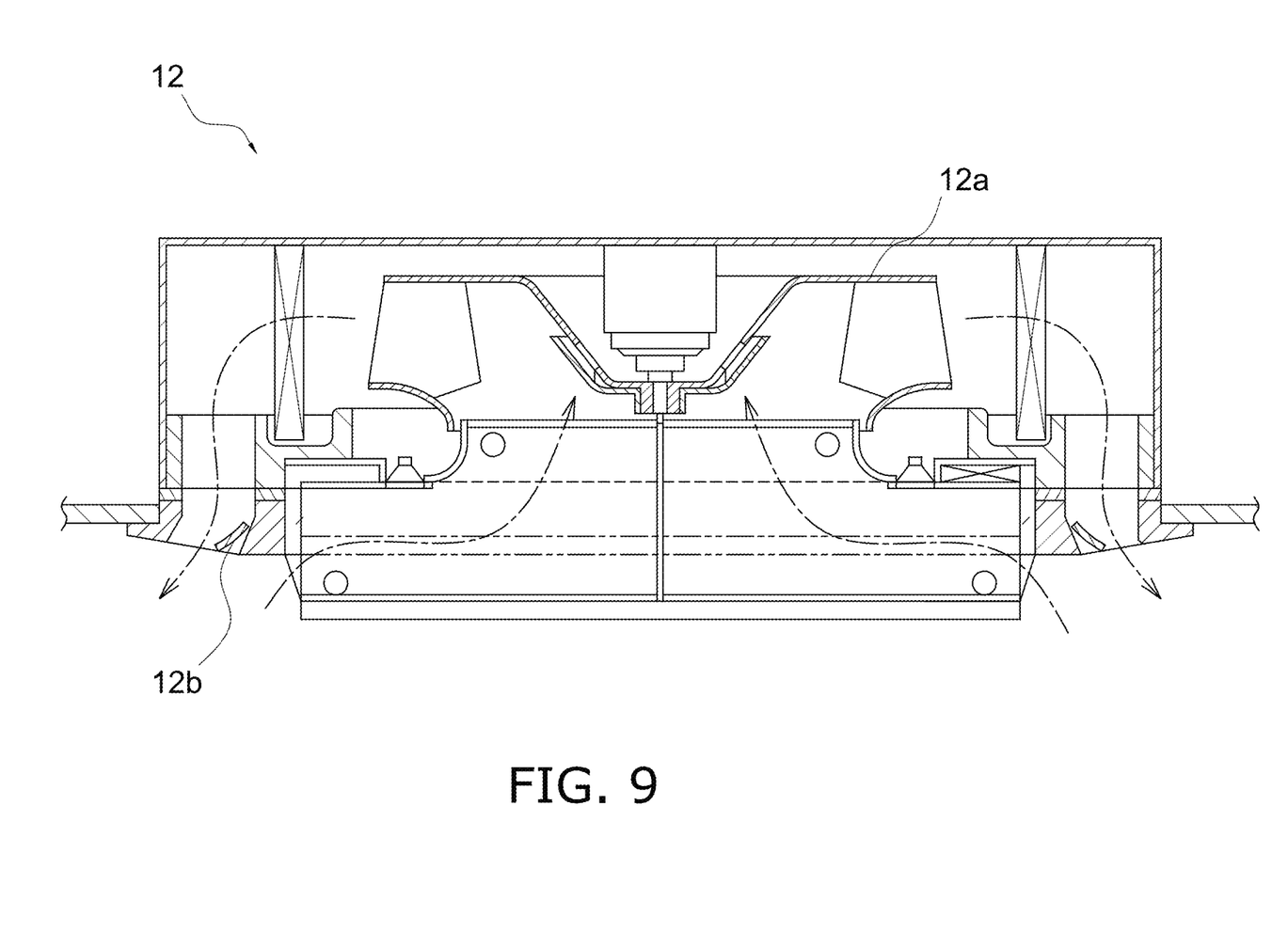
FIG. 9 is a cross-sectional view of an indoor unit.

The notification units 50 may notify the worker by motion. FIG. 9 is a cross-sectional view of the indoor unit 12. The indoor unit 12 includes a fan 12a serving as a first movable component, and a flap 12b serving as a second movable component. The fan 12a causes air to be blown out from the indoor unit 12 by rotary motion to notify the worker. The flap 12b changes a direction of the air blown out from the indoor unit 12 to notify the worker. Both the fan 12a and the flap 12b may be used as the notification unit 50, or the fan 12a alone may be used as the notification unit 50. Note that the first movable component and the second movable component are not limited to the fan 12a and the flap 12b, respectively, and may be any components capable of notifying the worker by motion.

(6-4)

In the embodiment described above, in accordance with control performed by the display control unit 33, the display unit 34 of the mobile terminal 30 displays the information generated by the information generation unit 32 in association with the identification information of the indoor unit 12 corresponding to the electromagnetic wave emitter 20 in a manner as illustrated in FIG. 5. However, the display is not limited to this.

For example, on the basis of the information generated by the information generation unit 32, the display unit 34 may display only the pieces of identification information of the plurality of indoor units 12 in ascending order, or may display only the indoor unit 12 installed at the location nearest the worker. The display unit 34 performs the display that allows the worker to identify the indoor unit 12 installed at a location near the worker.

(6-5)

Figure 10:
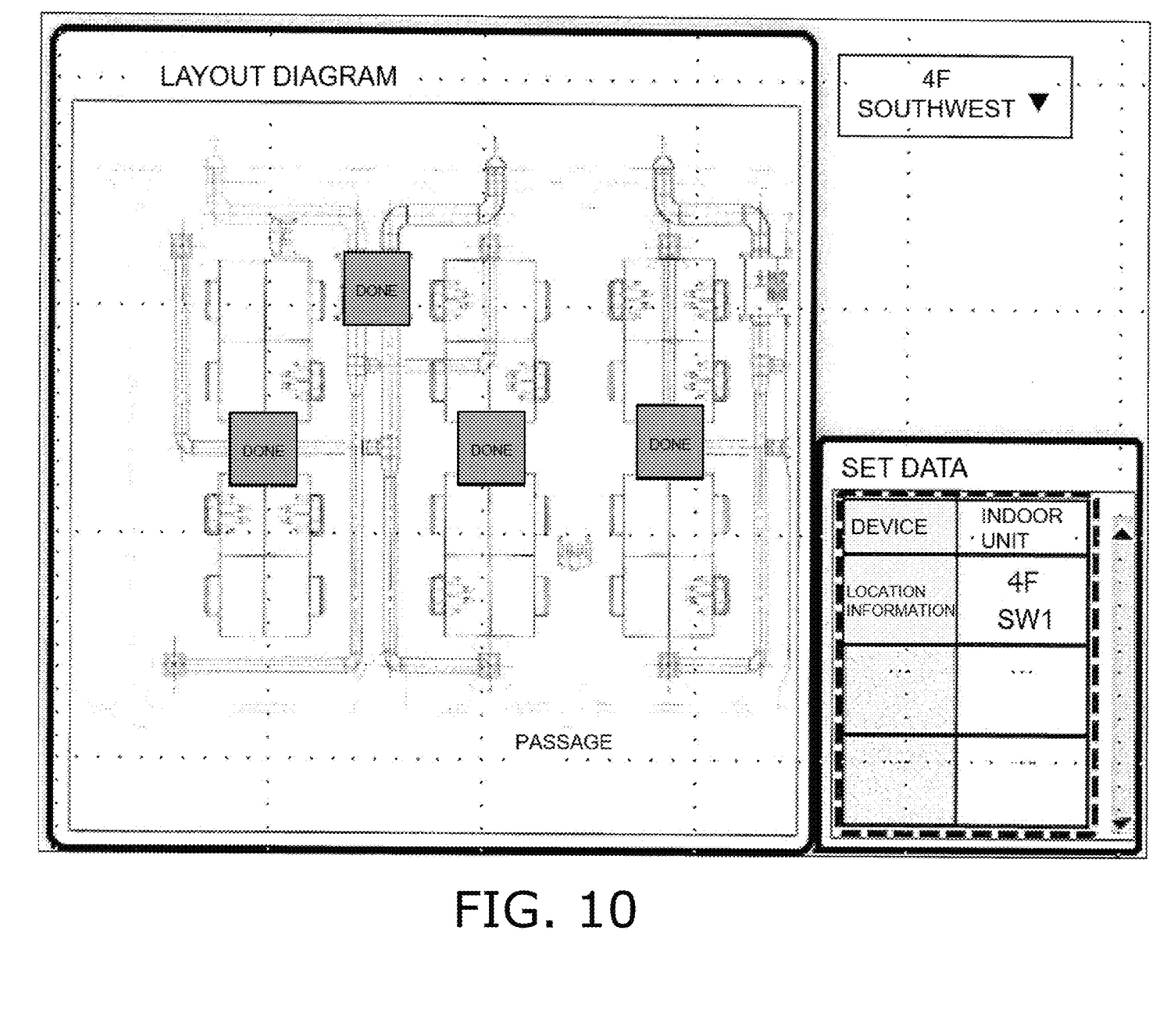
FIG. 10 illustrates an example of an input screen for registration work according to a modification.

In the embodiment described above, in the registration work, the worker associates the identified identification information of the indoor unit 12 with the location information. However, the worker may associate the location information with the identified identification information of the indoor unit 12. Specifically, an input screen as illustrated in FIG. 10 is displayed on the input unit 35 of the mobile terminal 30. The worker selects appropriate location information from a layout diagram of the indoor units 12 in the management-target building displayed in the input screen, and inputs the identified identification information of the indoor unit 12. Consequently, the location information and the identification information of the indoor unit 12 are associated with each other.

(6-6)

In the embodiment described above, in the registration work, information in which the identification information and the location information are associated with each other is input from the mobile terminal 30. However, the information may be input with each remote controller of the corresponding indoor unit 12. The remote controller is a so-called wired remote control device and is connected to the corresponding indoor unit 12 through a communication line. The information input from the remote controller is transmitted to the remote management apparatus 200 via the Internet N.

In addition, an instruction to emit the electromagnetic wave 40 may be given by the remote control.

(6-7)

In the embodiment described above, the mobile terminal 30 is connected to the Internet N and is capable of communicating with the remote management apparatus 200. However, the mobile terminal 30 need not be connected to the Internet N. In this case, the mobile terminal 30 performs short-range wireless communication with the indoor unit 12 and transmits the information in which the identification information and the location information are associated with each other to the remote management apparatus 200 via the indoor unit 12.

Alternatively, the worker may bring the mobile terminal 30 to a location where the remote management apparatus 200 is present after all the registration work is completed and may connect the mobile terminal 30 to the remote management apparatus 200 with a cable to transmit the information.

(6-8)

In the embodiment described above, the electromagnetic wave emitters 20 emit the electromagnetic waves 40 in step S2 of the example of the operation of the registration work. However, the electromagnetic wave emitters 20 may emit the electromagnetic waves 40 all the time. Thus, step S2 of the example of the operation of the registration work may be omitted.

(6-9)

In the embodiment described above, the notification unit 50 that has received the identification information by the worker and the notification start instruction starts notification in step S10 of the example of the operation of the registration work. However, the notification unit 50 performs notification after the identification information and the location information are associated with each other. However, a timing at which the notification unit 50 performs notification is not limited to this. For example, the notification unit 50 may perform notification in response to the corresponding indoor unit 12 being selected with the mobile terminal 30 during the registration work performed by the worker.

(7)

While the embodiment of the present disclosure has been described above, it should be understood that various modifications can be made on the configurations and details without departing from the gist and the scope of the present disclosure that are described in the claims.

What is claimed is:

1. A device-registration-work assisting system comprising:
    a plurality of notification units, each notification unit being built in or disposed near one of a plurality of devices subjected to registration work, the notification units and the devices being electrically connected to each other in a one-to-one manner;
    a plurality of electromagnetic wave emitters, each of the plurality of electromagnetic wave emitters being built in or disposed near one of the plurality of devices, and each electromagnetic wave emitter being configured to emit a plurality of electromagnetic waves having different intensities; and
    a mobile terminal configured to be carried by a worker, the mobile terminal including
        a display unit configured to display information regarding each of the devices,
        an intensity measurement unit configured to measure intensities of the plurality of electromagnetic waves emitted by each of the electromagnetic wave emitters, and
        a selection unit configured to select one of the devices,
    each of the devices being communicably connected to a remote management device via the Internet,
    the mobile terminal being communicably connected to the remote management device via the Internet,
    the notification units being configured such that when one device among the plurality of devices is selected by the selection unit, a corresponding one of the notification units receives information indicating that the one device is selected via the Internet, the remote management device, and the one device and the corresponding one of the notification units notifies the worker by light, sound, or motion that the one device has been selected with the selection unit.

2. The device-registration-work assisting system according to claim 1, wherein
    the notification unit is configured to notify the worker by emitting at least one of light or sound.

3. The device-registration-work assisting system according to claim 2, wherein
    the mobile terminal further includes a display control unit configured to control, based on the intensity of the electromagnetic waves measured by the intensity measurement unit, display of the display control unit such that the worker is able to identify the device installed at a location near the worker.

4. The device-registration-work assisting system according to claim 1, wherein
    the devices are air-conditioning indoor units, and
    the notification unit of at least one of the air-conditioning indoor units is one of
        a first movable component configured to move to blow out air from the air-conditioning indoor unit and a second movable component configured to move to change a direction of the air blown out from the air-conditioning indoor unit.

5. The device-registration-work assisting system according to claim 1, wherein
the mobile terminal further includes a display control unit configured to control, based on the intensity of the electromagnetic waves measured by the intensity measurement unit, display of the display control unit such that the worker is able to identify the device installed at a location near the worker.

6. The device-registration-work assisting system according to claim 1, wherein
the mobile terminal further includes a display control unit configured to control, based on the intensity of the electromagnetic waves measured by the intensity measurement unit, display of the display control unit such that the worker is able to identify the device installed at a location near the worker.

* * * * *

(12) EX PARTE REEXAMINATION CERTIFICATE (13114th)
United States Patent
Higashiyama et al.

(10) Number: US 11,879,652 C1
(45) Certificate Issued: Dec. 15, 2025

(54) DEVICE-REGISTRATION-WORK ASSISTING SYSTEM

(71) Applicant: DAIKIN INDUSTRIES, LTD., Osaka (JP)

(72) Inventors: Shin Higashiyama, Osaka (JP); Hiroshi Dohmae, Osaka (JP); Sou Yanagimoto, Osaka (JP)

(73) Assignee: DAIKIN INDUSTRIES, LTD., Osaka (JP)

Reexamination Request:
No. 90/019,947, May 2, 2025

Reexamination Certificate for:
Patent No.: 11,879,652
Issued: Jan. 23, 2024
Appl. No.: 17/426,570
PCT Filed: Feb. 6, 2020
PCT No.: PCT/JP2020/004540
§ 371 (c)(1),
(2) Date: Jul. 28, 2021
PCT Pub. No.: WO2020/166481
PCT Pub. Date: Aug. 20, 2020

(51) Int. Cl.
*F24F 11/00* (2018.01)
*F24F 11/49* (2018.01)
*F24F 11/72* (2018.01)
*F24F 11/80* (2018.01)

(52) U.S. Cl.
CPC .............. *F24F 11/49* (2018.01); *F24F 11/72* (2018.01); *F24F 11/80* (2018.01)

(58) Field of Classification Search
None
See application file for complete search history.

(56) References Cited

To view the complete listing of prior art documents cited during the proceeding for Reexamination Control Number 90/019,947, please refer to the USPTO's Patent Electronic System.

*Primary Examiner* — Deandra M Hughes (57) ABSTRACT

A device-registration-work assisting system includes a plurality of notification units, and a mobile terminal carriable by a worker. Each notification unit is built in or disposed near one of a plurality of devices subjected to registration work. The mobile terminal includes a display unit configured to display information regarding each of the devices, and a selection unit configured to select a corresponding one of the devices. The notification unit is configured to notify the worker by light, sound, or motion in response to the corresponding device being selected with the selection unit.

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-6 are cancelled.

\* \* \* \* \*